United States Patent [19]

Sanford et al.

[11] Patent Number: 4,607,916

[45] Date of Patent: Aug. 26, 1986

[54] APPARATUS FOR CONTROLLING THE ROTATION OF THE PLANE OF LINEAR POLARIZATION OF LINEARLY POLARIZED RADIANT ENERGY TRAVERSING AN ELEMENT OF CHROMIUM CHALCOGENIDE SPINEL MAGNETIC SEMICONDUCTOR WITH ELLIPTICALLY POLARIZED RADIANT ENERGY

[75] Inventors: Norman A. Sanford, Arlington; William J. Miniscalco, Sudbury; Alexander Lempicki, Boston, all of Mass.

[73] Assignee: GTE Laboratories Incorporated, Waltham, Mass.

[21] Appl. No.: 590,807

[22] Filed: Mar. 19, 1984

[51] Int. Cl.⁴ .............................................. G02F 1/09
[52] U.S. Cl. ............................................... 350/376
[58] Field of Search ................. 350/354, 376, 378, 393

[56] References Cited

U.S. PATENT DOCUMENTS 4,190,811  2/1980  Alcock et al. ...................... 350/354

OTHER PUBLICATIONS

Golik et al., "Magnetooptic Properties of $CdCr_2Se_4$ Single Crystals Near the Absorption Edge", *Sov. Phys. Solid State* 3-1980, pp. 512-513.

Genkin et al., "Direct Observation of Photomagnetization of the Ferromagnet $Cd Cr_2Se_4$ by Circularly Polarized Light", *Jetdlett* 2-1982, pp. 199-202.

Nguyen et al., "Fast Optically Controlled Modulator for a $CO_2$ Laser Using Two-Photon Magnetoabsorption Effects in CdS", *Appl. Phys. Lett.* 11-1977, pp. 603-606.

Sanford et al., "Influence of Polarized Optical Pumping on the Ferromagnetism of $CdCr_2Se_4$, *Phys. Rev. Lett.* 5-1983, pp. 1803-1806.

*Primary Examiner*—William H. Punter
*Attorney, Agent, or Firm*—David M. Keay

[57] ABSTRACT

Apparatus employing a light beam to affect another light beam. A primary beam of linearly polarized monochromatic light is directed on an element of chromium chalcogenide spinel magnetic semiconductor, specifically single crystal $CdCr_2Se_4$. A control beam of monochromatic light is selectively elliptically polarized and directed at the element. As the light beams traverse the same path through the element the circularly polarized control beam interacts with the element thereby changing the effect of the element on the linearly polarized primary beam to rotate the plane of linear polarization of the primary beam. A linear polarization analyzer receives the primary beam from the element and passes, blocks, or diverts light depending upon the plane of linear polarization of the incident light.

13 Claims, 2 Drawing Figures

APPARATUS FOR CONTROLLING THE ROTATION OF THE PLANE OF LINEAR POLARIZATION OF LINEARLY POLARIZED RADIANT ENERGY TRAVERSING AN ELEMENT OF CHROMIUM CHALCOGENIDE SPINEL MAGNETIC SEMICONDUCTOR WITH ELLIPTICALLY POLARIZED RADIANT ENERGY

BACKGROUND OF THE INVENTION

This invention relates to apparatus for controlling beams of radiant energy. More particularly, it is concerned with apparatus employing a light beam to modulate, switch, or otherwise affect another light beam.

Communication systems employing light beams as the means for transmitting information have been in development over the past few years. In order to make use of light beams as information transmitting media it is necessary to modulate, switch, and otherwise control light beams. Apparatus for performing control functions are required in order to permit future progress in the field of optical communication systems. Specifically, improved apparatus which modulates and/or switches monochromatic light are desired.

SUMMARY OF THE INVENTION

Optical control apparatus in accordance with the present invention comprises a first source for producing a primary beam of linearly polarized radiant energy. The apparatus also includes a second source for producing a control beam of elliptically polarized radiant energy The primary beam of linearly polarized radiant energy and the control beam of elliptically polarized radiant energy are directed at an element of chromium chalcogenide spinel magnetic semiconductor to traverse the element generally along the same path. The control beam of elliptically polarized radiant energy interacts with the element thereby changing the effect of the element on the primary beam of linearly polarized radiant energy to rotate the plane of linear polarization of the primary beam in accordance with the state of elliptical polarization of the control beam. The primary beam of radiant energy from the element of chromium chalcogenide spinel magnetic semiconductor is received by an output means which permits passage therethrough of the components of a linearly polarized beam of radiant energy lying in a plane parallel to a reference plane.

The element of chromium chalcogenide spinel magnetic semiconductor may be selected from the single crystal spinels having the general formula $ACr_2X_4$ in which A is either Cd, Zn, or Hg, and X is either Se, S, or Te. More specifically, the preferred material for the element is a single crystal of $CdCr_2Se_4$.

The effect of an elliptically polarized control beam on a linearly polarized primary beam passing through a chromium chalcogenide spinel magnetic semiconductor to change its Faraday rotation spectrum is described in an article entitled of "Influence of Polarized Optical Pumping on the Ferromagnetism of $CdCr_2Se_4$" by N. A. Sanford, R. W. Davies, A. Lempicki, W. J. Miniscalco, and S. J. Nettel in Physical Review Letters, Vol. 50, No. 22, page 1803, May 30, 1983.

For a better understanding of the present invention, together with other and further objects, advantages, and capabilities thereof, reference is made to the following discussion and appended claims in connection with the above-described drawings.

DETAILED DESCRIPTION OF THE INVENTION

Figure 1:
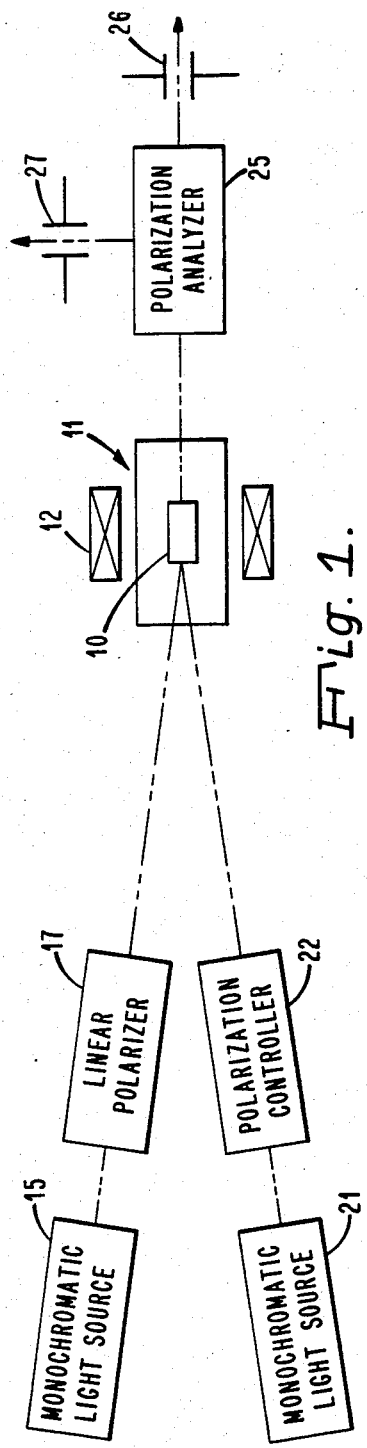
FIG. 1 is a schematic representation of optical control apparatus in accordance with the present invention.

Optical control apparatus in accordance with the present invention as illustrated in the schematic representation of FIG. 1 includes an element 10 of a chromium chalcogenide spinel magnetic semiconductor, specifically single crystal $CdCr_2Se_4$. The element is mounted in a cooling and temperature control apparatus 11 which maintains the element at a temperature below its Curie temperature (131° K. for $CdCr_2Se_4$). The particular temperature may be selected so as to optimize the operation of the apparatus for a particular element thickness, primary beam wavelength, and control beam wavelength. The element is immersed in a magnetic field produced by a magnet 12 of sufficient strength to ensure a single magnetic domain within the element. The operation of the apparatus is enhanced if the applied magnetic field is also of sufficient strength to saturate the magnetization of the element. (For an element of $CdCr_2Se_4$ at 77° K., a magnetic field of 2,000 gauss is sufficient to both saturate the magnetization and make the entire element a single magnetic domain.)

The apparatus operates on a primary beam of linearly polarized monochromatic radiant energy as from a source of monochromatic light 15 and a linear polarizer 17. Depending upon the particular application, the light source 15 and the polarizer 17 may be located in close proximity to or remotely from the other components. The primary beam may be either digital or analog encoded with information and may be continuous wave or pulsed.

The apparatus also requires a second or control beam of monochromatic radiant energy as from a source of monochromatic light 21. Information is contained in the control beam by the state of elliptical polarization as produced by a polarization controller 22. Again, depending upon the particular application of the apparatus the light source 21 and polarization controller 22 may be located in close proximity to or remotely from the other components. The control beam may be either digital or analog encoded with information and may be continuous wave or pulsed.

The linearly polarized monochromatic primary light beam and the monochromatic control light beam with controlled elliptical polarization have approximately the same optical axis and both impinge on the element 10 of $CdCr_2Se_4$ at approximately the same spot so as to traverse the element along the same path traveling in either the same or in the opposite direction. The optical axis is parallel to the applied magnetic field. In the apparatus the effect of the element upon the control beam is not influenced by the presence or absence of the primary beam. The plane of linear polarization of the primary beam is rotated from its original orientation as the beam travels through the element. In the absence of the controlling beam this effect corresponds to the well-known Faraday rotation produced by magnetic materials in applied magnetic fields. The rotation angle is defined as the angle between the plane of linear polarization of the primary beam when it is incident upon the element and its plane of linear polarization when it emerges from the element. The rotation angle is a function of the primary beam wavelength, the element temperature, the path length through the element, and whether or not a control beam is incident on the element. The rotation angle is altered when the control beam is present, and the most extreme changes are produced by right and left circularly polarized light. Details of the nature of these above and a proposed explanation thereof are discussed in the above-mentioned article by Sanford et al.

Figure 2:
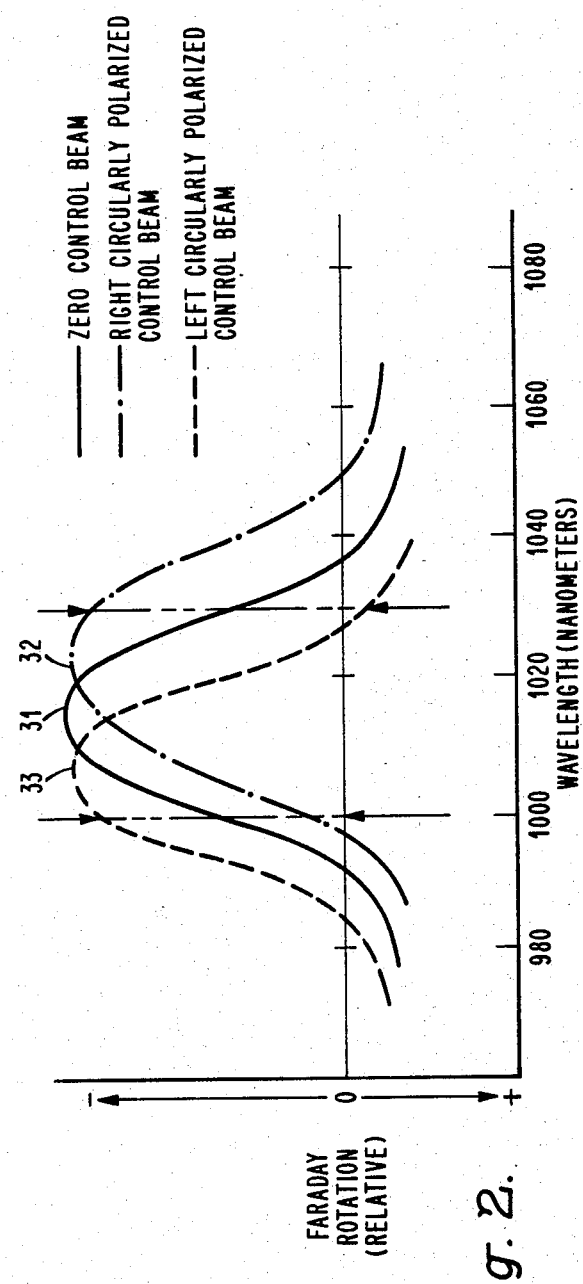
FIG. 2 includes curves illustrating Faraday rotation spectra of an element of single crystal $CdCr_2Se_4$.

The curves of FIG. 2 illustrate this phenomenon as it is utilized in the apparatus of FIG. 1. Curve 31 illustrates the Faraday rotation spectrum (i.e., rotation angle as a function of wavelength) for the primary beam transmitted through an element of $CdCr_2Se_4$ in a magnetic field at a temperature of 78° K. in the absence of a control light beam. Curves 32 and 33 illustrate the shift of the spectrum produced by the coincidence of a control beam with right circularly polarized light and left circularly polarized light, respectively. For a specific example the wavelength of the control beam is 1064 nanometers. As illustrated by FIG. 2, at wavelengths of approximately 1000 nanometers and 1030 nanometers occur the greatest differences in rotation angle of the primary beam that can be produced by changing the elliptical polarization state of the controlling beam between the extremes of right circular polarization as illustrated by curve 32 and left circular polarization as illustrated by curve 33. It has been determined empirically that curves 32 and 33 illustrate the maximum shifts in the Faraday rotation spectrum of $CdCr_2Se_4$ at 78° K. that can be produced by a control beam with any polarization state. Accordingly, the intermediate elliptical states of polarization will produce curves closer to that of the basic spectrum 31. Therefore, for a given primary beam wavelength any rotation angle between curves 32 and 33 at that wavelength can be produced by suitably adjusting the elliptical polarization of the control beam to a state intermediate between the extremes of right circular and left circular. The absolute values of the rotation angles that can be obtained for the primary beam are directly proportional to the distance travelled through the element.

The primary light beam which emerges from the element 10 is directed to a polarization analyzer 25. The analyzer 25 is a linear polarizer which possesses a reference plane or preferred axis. For certain applications the analyzer 25 transmits with no deviation light which is linearly polarized parallel to its reference plane and completely blocks the transmission of light linearly polarized normal to its reference plane. If the primary beam is incident upon the analyzer 25 with a plane of linear polarization which forms an intermediate angle between 0 and 90 degrees with the reference plane of the analyzer 25, the primary beam will be partially transmitted through the analyzer 25. That is, those components of the linearly polarized beam which lie in a plane parallel to the reference plane are passed and those components which are normal to the reference plane are blocked. That portion of the primary beam which emerges from the analyzer 25 undeviated passes through an output port 26. The reference plane of the analyzer 25 can be set at any desired angle with respect to the other components of the apparatus so as to transmit a maximum amount of the primary beam for a given elliptical polarization state of the control beam. Then by varying the elliptical polarization state of the control beam and thereby varying the angular orientation of the plane of linear polarization of the primary beam which impinges on the analyzer 25, the intensity of the primary beam which is transmitted through the analyzer 25 is varied. Accordingly, the primary beam passing through the output port 26 is amplitude modulated.

Alternatively, the analyzer 25 can be such that the primary beam is transmitted undeflected if its plane of linear polarization is parallel to the reference plane of the analyzer 25, and is deflected in a different direction through a second output port 27 if the plane of linear polarization of the primary beam is normal to the reference plane of the analyzer 25. Intermediate orientation angles for the plane of linear polarization of the primary beam will result in the beam intensity being divided between the two output ports 26 and 27.

The apparatus of FIG. 1 as described hereinabove may be utilized for various control functions. For example, the apparatus may function as a two-input AND logic gate. The two possible logic states for the linear polarized primary beam are full intensity and zero intensity. The two possible logic states for the control beam are right circularly polarized and left circularly polarized. The various factors affecting the angle of rotation of the primary beam as discussed hereinabove are selected such that at the wavelength of the primary beam the difference in rotation between curves 32 and 33 of FIG. 2 is 90 degrees. The analyzer 25 is arranged with its reference plane oriented such that when the control beam is right circularly polarized, a primary beam emerging from the element 10 is linearly polarized in a plane parallel to the reference plane. When the control beam is left circularly polarized, a primary beam emerging from the element 10 is linearly polarized in a plane at 90 degrees to the reference plane. Accordingly, if either the primary beam is at zero intensity or the control beam is left circularly polarized, there is no light output from the analyzer 25. Only if both the primary beam is present and the control beam is right circularly polarized does light emanate from the analyzer 25.

The apparatus may function as an optical switch or shutter for a primary beam which is encoded with information remotely from the other components. The control beam is selectively right circularly polarized or left circularly polarized by the polarization controller 22. The polarization controller 22 may be actuated by any suitable type of input, such as electrical signals or optical signals. The factors affecting the angle of rotation of the primary beam as it passes through the element 10 are selected such that at the wavelength of the primary beam the difference in rotation between curves 32 and 33 of FIG. 2 is 90 degrees. The analyzer 25 is arranged with its reference plane oriented such that when the control beam is left circularly polarized the primary beam emerging from the element 10 is linearly polarized in a plane at 90 degrees to the reference plane. When the control beam is right circularly polarized the primary beam impinging on the analyzer 25 is linearly polarized in a plane parallel to the reference plane. Thus, to permit the passage of the primary beam through the apparatus, the polarization controller 22 is actuated to right circularly polarize the control beam, and to block the passage of the primary beam through the apparatus, the polarization controller 22 is actuated to left circularly polarize the control beam.

As an alternative a modified analyzer 25 is employed which transmits a primary beam linearly polarized in a plane parallel to the reference plane through an output port 26 and which transmits a primary beam linearly polarized in a plane perpendicular to the reference plane through a different output port 27. Thus, the primary beam may be selectively routed into either of two output paths by actuating the polarization controller 22 to circularly polarize the control beam in one direction or the other.

The apparatus may serve as a two-channel multiplexer. The primary beam is one input channel with information encoded by amplitude modulation. The control beam is the other input channel with information encoded by modulation of the state of elliptical polarization. The functions of the element 10 and the analyzer 25 combine to form the product of the two signals with the result that the primary beam emerges from the apparatus through the output port 26 with amplitude modulation at the sum and difference of the two input frequencies.

The apparatus may also be employed as an optical modulator for amplitude modulating an unmodulated linearly polarized primary beam. In order to be able to obtain 100% modulation of the primary beam the factors affecting the angle of rotation of the plane of linear polarization of the primary beam are selected such that at the wavelength of the primary beam the difference between the curves 32 and 33 of FIG. 2 is 90 degrees. The reference plane of the analyzer 25 is oriented so that when the control beam is right circularly polarized, all of the primary beam is passed through the analyzer 25 by way of the output port 26, and when the control beam is left circularly polarized, the analyzer 25 blocks the passage of the primary beam. Thus, by actuating the polarization controller 22 to selectively elliptically modulate the control beam within the extremes of right and left circular polarization the amplitude of the primary beam is modulated.

While there has been shown and described what are considered preferred embodiments of the present invention, it will be obvious to those skilled in the art that various changes and modifications may be made therein without departing from the invention as defined by the appended claims.

What is claimed is:

1. Optical control apparatus comprising
a first source for producing a primary beam of linearly polarized radiant energy;
a second source for producing a control beam of elliptically polarized radiant energy;
an element of chromium chalcogenide spinel magnetic semiconductor;
the primary beam of linearly polarized radiant energy and the control beam of elliptically polarized radiant energy being directed at the element of chromium chalcogenide spinel magnetic semiconductor to traverse the element generally along the same path;
cooling means for maintaining the temperature of said element of chromium chalcogenide spinel magnetic semiconductor below its Curie temperature;
magnetic means for producing a magnetic field parallel to said path and magnetically saturating said element of chromium chalcogenide spinel magnetic semiconductor in the ferromagnetic phase to ensure a single magnetic domain therein;
the control beam of elliptically polarized radiant energy interacting with the element thereby changing the effect of the element on the primary beam of linearly polarized radiant energy to rotate the plane of linear polarization of the primary beam in accordance with the state of elliptical polarization of the control beam; and
output means for receiving the primary beam of radiant energy from the element of chromium chalcogenide spinel magnetic semiconductor, said output means being operable to permit passage therethrough of the components of a linearly polarized beam of radiant energy lying in a plane parallel to a reference plane.

2. Optical control apparatus in accordance with claim 1 wherein
said output means is operable to prevent passage therethrough of the components of a linearly polarized beam of radiant energy lying in a plane normal to the reference plane.

3. Optical control apparatus in accordance with claim 2 wherein
the element of chromium chalcogenide spinel magnetic semiconductor is a single crystal having the formula $ACr_2X_4$ wherein A is selected from the group consisting of Cd, Zn, and Hg, and X is selected from the group consisting of Se, S, and Te.

4. Optical control apparatus in accordance with claim 3 wherein
the primary beam of radiant energy is of monochromatic light; and
the control beam of radiant energy is of monochromatic light.

5. Optical control apparatus in accordance with claim 4 wherein
the element of chromium chalcogenide spinel magnetic semiconductor is a single crystal of $CdCr_2Se_4$.

6. Optical control apparatus in accordance with claim 1 wherein
said second source includes means for selectively producing a control beam having a right circular polarization state or a left circular polarization state;
the control beam of circularly polarized radiant energy traversing the element of chromium chalcogenide spinel magnetic semiconductor interacts with the element to rotate the plane of linear polarization of the primary beam of linearly polarized radiant energy traversing the element to a first plane of linear polarization when the control beam is circularly polarized in the right circular polarization state and to rotate the plane of linear polarization of the primary beam to a second plane of linear polarization when the control beam is circularly polarized in the left circular polarization state, said first and second planes of linear polarization lying at 90° to each other; and
said output means is operable to permit passage therethrough of the primary beam of radiant energy when it is linearly polarized in one of said first and second planes of linear polarization and to prevent passage of the primary beam of radiant energy when it is linearly polarized in the other of said first and second planes of linear polarization.

7. Optical control apparatus in accordance with claim 6 wherein the element of chromium chalcogenide spinel magnetic semiconductor is a single crystal having the formula $ACr_2X_4$ wherein A is selected from the group consisting of Cd, Zn, and Hg, and X is selected from the group consisting of Se, S, and Te.

8. Optical control apparatus in accordance with claim 7 wherein the primary beam of radiant energy is of monochromatic light; and the control beam of radiant energy is of monochromatic light.

9. Optical control apparatus in accordance with claim 9 wherein the element of chromium chalcogenide spinel magnetic semiconductor is a single crystal of $CdCr_2Se_4$.

10. Optical control apparatus in accordance with claim 1 wherein said second includes means for selectively producing a control beam having a right circular polarization state or a left circular polarization state;

the control beam of circularly polarized radiant energy traversing the element of chromium chalcogenide spinel magnetic semiconductor interacts with the element to rotate the plane of linear polarization of the primary beam of linearly polarized radiant energy traversing the element to a first plane of linear polarization when the control beam is circularly polarized in the right circular polarization state and to rotate the plane of linear polarization of the primary beam to a second plane of linear polarization when the control beam is circularly polarized in the left circular polarization state, said first and second planes of linear polarization lying at 90° to each other; and said output means includes a first output port and a second output port, said output means being operable to direct the primary beam of radiant energy through the first output port when it is linearly polarized in said first plane of polarization and to direct the primary beam of radiant energy through the second output port when it is linearly polarized in said second plane of polarization.

11. Optical control apparatus in accordance with claim 10 wherein the element of chromium chalcogenide spinel magnetic semiconductor is a single crystal having the formula $ACr_2X_4$ wherein A is selected from the group consisting of Cd, Zn, and Hg, and X is selected from the group consisting of Se, S, and Te.

12. Optical control apparatus in accordance with claim 11 wherein the primary beam of radiant energy is of monochromatic light; and the control beam of radiant energy is of monochromatic light.

13. Optical control apparatus in accordance with claim 12 wherein the element of chromium chalcogenide spinel magnetic semiconductor is a single crystal of $CdCr_2Se_4$.

* * * * *